May 19, 1970            G. RAUGLAS            3,512,619

TWO WAY AUTOMATIC BRAKE ADJUSTER

Filed May 31, 1968            3 Sheets-Sheet 1

Inventor
Gerard Rauglas
By Mann Brown and McWilliams
Attys.

United States Patent Office 3,512,619
Patented May 19, 1970

3,512,619
TWO WAY AUTOMATIC BRAKE ADJUSTER
Gerard Rauglas, Aroma Park, Ill., assignor to Cardwell Westinghouse Company, a corporation of Delaware
Filed May 31, 1968, Ser. No. 733,633
Int. Cl. F16d 65/66
U.S. Cl. 188—202      8 Claims

ABSTRACT OF THE DISCLOSURE

The disclosure relates to a railroad car brake rigging brake adjuster that is automatic for both slack take up and let out, with the adjuster being shown in center rod application and comprising a screw member having one end portion thereof received in one end portion of a tubular member, with the other ends of the said members being incorporated in the brake rigging in a conventional manner. Associated with the tubular member and the screw member is a coupling assembly comprising a coupling nut, an adjusting nut, and a holding nut with the coupling and holding nuts being received in a chamber formed within the tubular member, and a housing surrounds the nuts at the telescoping portions of said members. The adjuster is held against distortion in draw up and in the riding condition by a first compression spring acting between the housing and the tubular member to bias a stop seat of the housing against the adjusting nut, while a second compression spring within the tubular member chamber acts between the tubular member and the holding nut to clutch same against rotational movement; a ball type wedge lock operating between the housing and the tubular member to provide a third point of movement control is disclosed which can optionally be used with or without the second spring. The arrangement of parts is such that full two way automatic operation is achieved while keeping the power loss at the brake cylinder at no more than about 4.5, and yet keeping the nuts of the coupling assembly locked against rotation during rigging draw up and in the riding position against the jars of end of car impacts and vibrations caused by rough or uneven trackage.

---

This application is an improvement over that disclosed in my application Ser. No. 628,711, filed Apr. 5, 1967 (the entire disclosure of which is hereby incorporated herein by this reference).

Railroad car brake rigging slack adjusters are subjected to much shock and vibration during car operation, and it has been found that there is a considerable tendency for the adjuster to be shaken out of its proper adjustment in relation to actual brake shoe wear so that when the brakes are next applied the rigging either has too little or too much slack for proper brake application.

This is particularly true in the case of adjusters of the screw and nut type since the nuts are ordinarily threaded on non-locking threads for ready rotation after release from stop clutch seats. The jarring and jiggling applied to the adjuster by end of car impacts and the vibrations caused by rough or uneven trackage has been found adequate in many instances to free the nut from it seat and result in sufficient rotation of the nut to throw the adjuster well out of adjustment, with the result that the brake cylinder stroke involves too much either over-travel or under-travel for good brake application.

My studies of this problem have revealed that this maladjustment of the adjuster under the conditions indicated can be avoided by increasing the strength of the spring or springs that clutch the nut against movement, but this can result in an increased power loss at the brake cylinder that significantly exceeds the 4.5 limitation prescribed by the A.A.R.

A principal object of this invention is to provide a brake adjuster of the screw and nut type which positively locks the adjuster against any adjusting movement that might tend to occur as a result of vibration, longitudinal shock due to end of car impacts, and the like, while keeping the power loss involved well below 4.5.

Another principal object of the invention is to provide for slack take up in adjusters of the screw and nut type where the spring means operates on the adjuster parts through a nut that is locked against rotation, rather than through a screw threading action and its inherent inefficiency due to friction loss.

Further objects of the invention are to provide a brake adjuster that is fully automatic for both slack take up and let out, to provide an adjuster that protects the rigging operating or trigger lever for center rod applications in the event that the rigging hand brake is applied when the brakes have already been set under emergency air conditions (when the car is separated from the train), and to provide a brake adjuster that is economical of manufacture, convenient to install, and readily adapted for application to conventional brake rigging arrangements.

Other objects, uses, and advantages will be obvious or become apparent from a consideration of the following detailed description and the application drawings in which like reference numerals are employed to designate like parts throughout the several views.

However, it is to be distinctly understood that the specific drawing illustrations provided are supplied primarily to comply with the requirements of the Patent Code and that the invention is susceptible of other embodiments as will be obvious to those skilled in the art.

GENERAL DESCRIPTION

Figures 1, 2, 3:
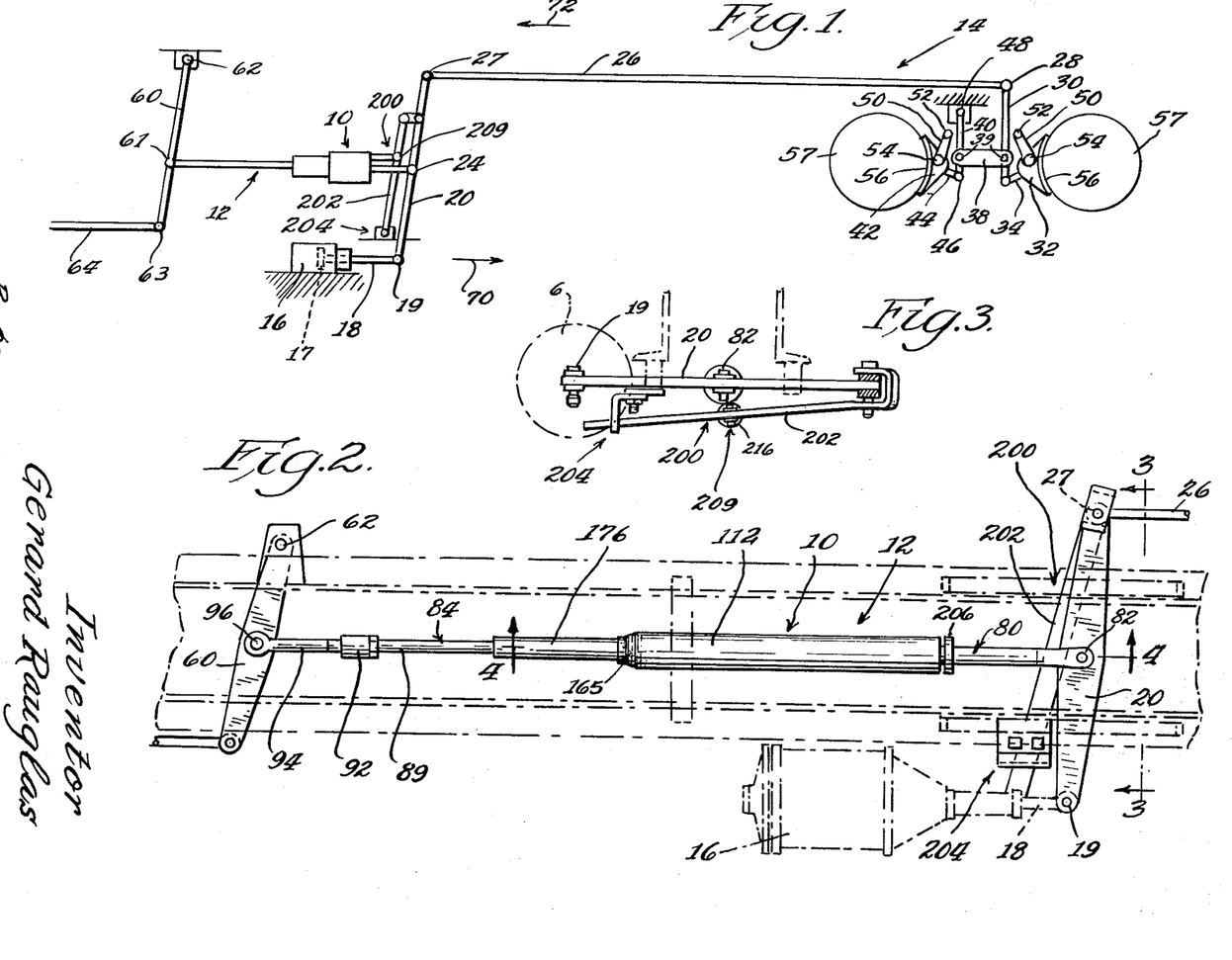
FIG. 1 is a diagrammatic view illustrating a typical brake rigging arrangement to which the brake adjuster of this application is directly applicable, with the adjuster application being of the center rod type.
FIG. 2 is a more specific view of the center rod portion of the brake rigging of FIG. 1 showing in plan the adjuster of this invention applied thereto.
FIG. 3 is a diagrammatic cross-sectional view substantially along line 3—3 of FIG. 2.
Figure 4:
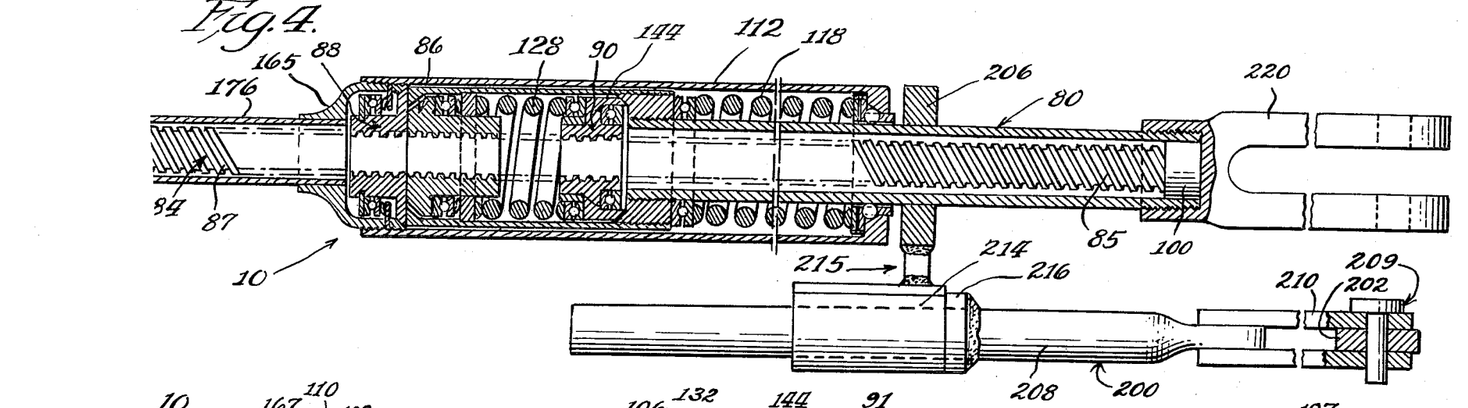
FIG. 4 is a longitudinal sectional view through the adjuster as it would appear along line 4—4 of FIG. 2.
Figure 5:
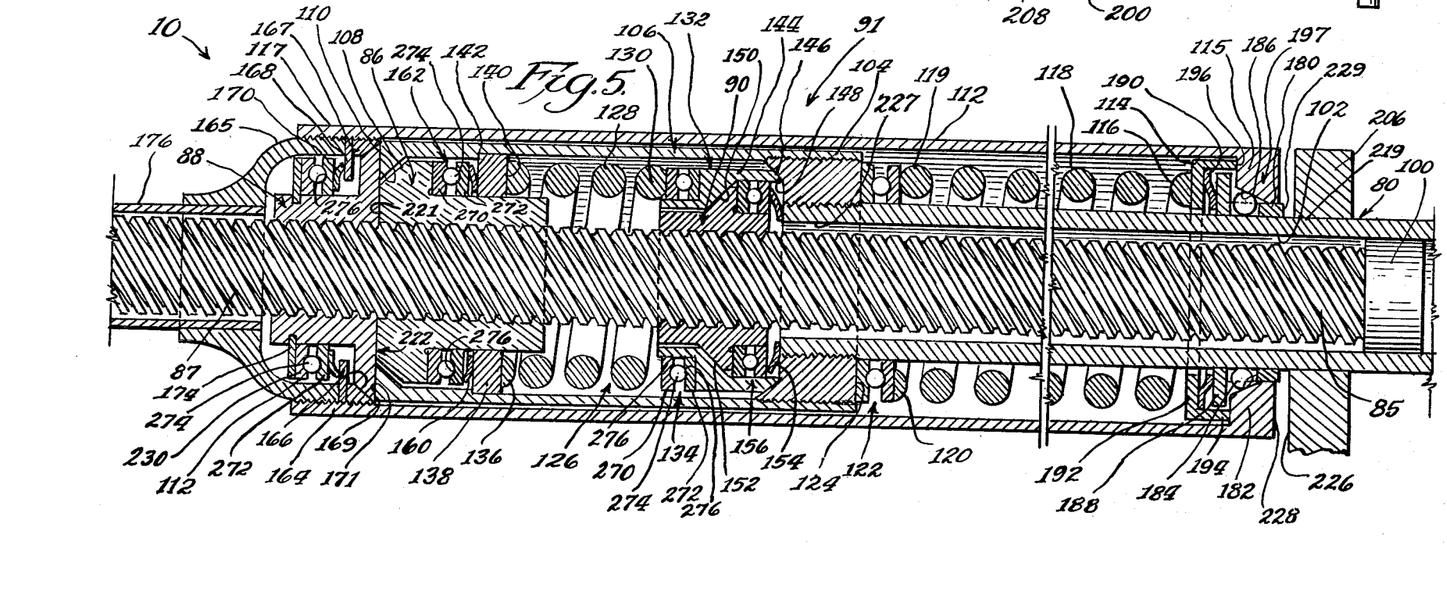
FIG. 5 is an enlarged cross-sectional view illustrating the coupling and adjusting nuts and associated structures that are shown in FIG. 4.

Referring now to FIG. 1, reference numeral 10 generally indicates a diagrammatically illustrated embodiment of this invention incorporated in the center rod structure 12 of a conventional brake rigging arrangement generally indicated by reference number 14. A specific embodiment of the adjuster 10 is shown in FIGS. 4 and 5, while the showing of FIGS. 1–3 shows a center rod application of the adjuster.

As is well known in the art, the brake rigging 14 customarily includes an air actuated brake cylinder 16 that is secured to the car in any suitable manner and includes a thrust or piston rod 18 that is pivotally connected as at 19 to a cylinder or live lever 20 which is in turn pivotally connected to the center rod structure 12 as at 24 and a connecting rod 26 as at 27 that extends to one of the car trucks where the rod 26 may be pivotally connected as at 28 to the actuating truck lever 30 that operates one of the brake beams 32 through a link 34 that is pivotally connected to truck dead lever 40 by link 38 and pivotal joints 39, and lever 40 is connected to the other brake beam 42 by a link 44 (the link 44 being pivotally connected to the lever 40 by pivotal joint 46) and with the lever 40 being pivotally connected to the car truck structure as at 48.

The brake beams 32 and 42 are customarily suspended from the truck by conventional hanger members 50 which are pivoted to the truck as at 52 and to the brake beam as at 54, respectively, and, of course, the brake beams each carry the diagrammatically illustrated brake shoes 56 which are to bear against the diagrammatically illustrated truck wheels 57 for braking purposes.

The center rod structure 12 is also pivotally connected as at 61 to a dead lever 60 which is fulcrumed in any suitable manner to the car structure as at 62 and which is pivotally connected as at 63 to connecting rod 64 that is in turn operatively connected with the truck brake apparatus of the other car truck in a manner similar to that shown at the right hand side of FIG. 1.

As is well known in the art, when the braking of the car is to be effected, the brake cylinder 16 is actuated to move its thrust rod or piston rod 18 to the right of FIG. 1 or in the direction of the arrow 70, which tends to throw the cylinder lever 20 counterclockwise about the pivotal connection 24 between it and the center rod structure 12. Likewise this motion tends to move the connecting rod 26 to the left of FIG. 1 in the direction of the arrow 72 to swing the truck lever 30 in a manner to force brake shoes 56 against the diagrammatically illustrated truck wheels 57. The brakes are in effect released when the air is released from the cylinder 16 in a conventional manner due to the fact that the weight of the brake beams 32 tends to swing them away from the respective wheels 57 about the pivotal hanger mountings 52, which thus causes the connecting rod 26, cylinder lever 20 and the thrust or piston rod 18 to move in directions opposite to those indicated by the arrows 70 and 72.

Of course, the connection of the center rod structure 12 with dead lever 60 operates the lever 60, connecting rod 64 and the truck braking apparatus the latter is connected within a manner that is similar to that mentioned with regard to the truck brake apparatus shown in FIG. 1.

AAR regulations require that the brake power stroke of cylinder 16 be between 7 and 9 inches, although brake cylinders are customarily proportioned and applied to the car to accommodate a stroke as high as 12 inches to accommodate extreme conditions. New cars when their brake rigging is applied and properly adjusted should provide a brake cylinder stroke of 7 inches, assuming that the car trucks have new brake shoes applied thereto.

As is well known in the art, brake shoes tend to wear away during each application of the car brakes and while the brake shoe attrition is not materially noticeable for each braking operation, it is cumulative and causes an increase in the amount of slack created in the rigging as day to day use of the car proceeds. The result is that each time the car brakes are to be applied, the brake levers must be moved just a little further toward the respective wheels of the truck each time, which means that a slightly increased movement of connecting rods 26 and 64, and the thrust or piston rod 18 (assuming no brake adjuster) is required for each time the brakes are applied. AAR regulations further require that when brake wear has proceeded to the point that the brake cylinder stroke has "over travel" of one inch over the basic brake cylinder stroke of seven inches, there must be sufficient take up in the rigging to restore the brake cylinder to approximately its original seven inch stroke.

The general function served by the brake adjuster 10 is to consistently maintain the stroke of the brake cylinder at the prescribed seven inches and to automatically accommodate or effect the brake rigging slack take up and let out that is involved in providing such results.

As indicated in FIGS. 2, 4 and 5, the adjuster 10 of FIGS. 1–5 generally comprises an elongate tubular member 80 pivotally connected to to the cylinder or live lever 20 by suitable pin 82 which forms the pivotal connection 24. The tubular member 80 receives a rod member 84 that has one end 85 thereof suitably threaded as at 87 for cooperation with a coupling nut 86, an adjusting nut 88 and a holding nut 90 that form a coupling assembly 91 between members 80 and 84. The other end 89 of the rod 84 (which is not threaded) is secured to a suitable fitting 92 which is in turn suitably secured to an extension rod 94 that is in turn pivoted to the dead lever 60 by pin 96 which forms the pivotal connection 61. The terminal portion 100 of rod member end 85 is customarily in the form of a bearing device that cooperates with bore 102 of member 80.

The terminal end portion 100 of rod 84 is received within the bore 102 of tubular member 80 and the tubular member 80 at its end 104 carries a housing 106 in which the coupling nut 86 and holding nut 90 are mounted, with the coupling nut 86 being provided with a stop clutch seat or surface 108 that cooperates with stop clutch seat or surface 110 of housing 106.

Received about the end 104 of the tubular member 80, the end 85 of rod member 84, and the nuts 86, 88 and 90, is a tubular housing 112 provided with a spring seat 114 at one end 115 thereof against which is applied one end 116 of the spring 118 being applied against a spring seat 120 which in the embodiment shown is in the form of ball bearing unit 122 that is seated against the shoulder 124 of tubular member 80 which is defined by housing 106 thereof.

The housing 106 of tubular member 80 defines a chamber 126 in which the coupling nut and the holding nut 90 are disposed, and interposed between the coupling nut 86 and the holding nut 90 is a compression spring 128 seated at one end 130 thereof against spring seat structure 132 that includes ball bearing unit 134, and at its other end 136, the spring 128 is seated against annular disc member 138 that defines spring seat 140, with the disc member 138 being in turn seated against internal shoulder 142 defined by housing 106.

Spring seat structure 132 in addition to ball bearing unit 134 comprises an annular member 144 defining a stop clutch seat 146 that engages stop clutch seat 148 of tubular member 80, and a second stop clutch seat 150 that engages stop clutch surface or seat 152 of the holding nut 90.

Interposed between the holding nut 90 and the tubular member 80 is a dished annular compression spring element 154 which biases the holding nut clutch stop clutch seat 152 against the stop clutch seat 150 of spring seat structure 132. Ball bearing unit 156 is interposed between the spring element 154 and nut 90 so that nut 90 may spin or rotate relative to member 80 when seats 150 and 152 separate.

Acting between spring seat forming disc 138 and the coupling nut 86 is a dished compression spring element 160 which tends to bias the coupling nut 86 against adjusting nut 88 in the riding position shown in the drawing figures, with the parts being proportioned such that stop clutch seats 108 and 110 will be separated in this position of the adjuster. Interposed between the spring 160 and the coupling nut is ball bearing unit 162 that permits the coupling nut to rotate relative to spring 160.

The adjusting nut 88 is formed with a stop clutch seat 164 at housing end 117 that cooperates with a stop clutch seat 166 that is defined by ring member 167 that is threaded into and is carried by the housing member 112. Housing member 112 also carries disc 168 which is interposed between ring member 167 and housing end member 165, which disc 168 forms a spring seat for dished compression spring element 170 that bears against ball bearing unit 172 carried by adjusting nut 188 and seated against the disc 174 that is fixed to adjusting nut 88.

The housing end member 165 carries tubular shield member 176 that is of sufficient length to overlie and protect the threading 87 of rod member 84 in all operative positions of the adjuster.

The adjusting nut 88 defines a planar stop clutch seat or surface 169 that engages planar stop clutch seat or surface 171 of tubular member 80, under the bias of spring 118. While these surfaces 169 and 171 are shown as planar, they also could be conical in configuration similar to surfaces 164 and 166, but I have found that the planar surfaces indicated are adequate for general purpose use.

Associated with spring seat 114 at the end 115 of housing 112 is a hub member 180 formed with a plurality of perforations 182 thereabout in each of which is disposed a bearing ball 184 that cooperate with a conical surface 186 of housing 112. The member 180 is flanged as at 188 for cooperation with a dished compression spring element 190 which bears against spring seat 114. Seat 114 comprises annular disc member 192 which includes a flange portion 194 defining an end portion 196 that seats against the end 115 of housing 112. The relation between the length of the flange portion 194 and its positioning should be such that when end 196 of flange portion 114 is seated against the end 115 of housing 112 as at 195, flange 188 of hub member 80 disposes balls 184 against seat 186 but not with sufficient bias to per se jam the balls 184 in locking relation between members 80 and 112, to insure that housing 112 is free to rotate with respect to tubular member 80 in a slack let out direction when the latter is sufficiently pulled to the right of FIGS. 2, 4 and 5 to separate surfaces 169 and 171.

The tub member 80, balls 184 and surface 186 or housing 112 form a ball type wedge lock device 197 that opposes withdrawal of tubular member 80 from housing 112 during draw up (tensioning of the rigging to apply the brake shoes to the wheels), thereby aiding in controlling undesired relative movement between the basic adjuster members 80 and 84. Springs 118 and 128 act on either side of coupling assembly 91 to hold same against change of position, and thus holds the adjuster against distortion, during draw up and in the riding position of the adjuster, which action is supplemented by the action of the wedge lock 197. Thus, the adjuster 10 has a three point movement control arrangement, in which spring 118 can have a strength on the order of 200 pounds and this insures that power losses at the brake cylinder will be below the limitation prescribed by the AAR.

Operably associated with the housing 112 adjacent the end 115 thereof is a thrust or trigger device 200, the operation of which is controlled by trigger lever 202 that is connected between the cylinder lever 20 at its pivotal connection 27 and bracket structure 204 (see FIGS. 2 and 3) of the general type disclosed in my Pat. No. 3,177,895, granted Apr. 13, 1965 (the disclosure of which is incorporated herein by this reference).

The thrust or trigger device 200 in the form shown comprises a disc member 206 slidably mounted on tubular member 80. Disc member 206 carries a connecting rod 208 that is suitably connected as at 209 to the operating or trigger lever 202. The rod 208 is connected to the trigger lever 202 at its end 210 while its other end 212 is slidably received in sleeve 214 that is fixed to disc member 206, as by weldment 215. Fixed as by welding to the rod 208 is a disc 216 that is positioned so that the brake cylinder will have the desired stroke with new brake shoes in place.

OPERATION OF ADJUSTER

The adjuster 10 as supplied for application to a car ordinarily will be in its fully contracted position of FIG. 4, in which the terminal portion 100 of the rod member 84 is disposed against the clevis structure 220 that forms the connection between the cylinder lever 20 and the tubular member 80.

In this connection, the adjuster 10 is applied to the center rod structure 12 and the trigger device or assembly 200 is appropriately associated with trigger lever 202 in the manner already described and illustrated or its equivalent. The positioning and orientation of the various parts of the device 200 are arranged in accordance with the slack take up and let out functions of adjuster 10 that are about to be described. In this connection, the swinging movement of the trigger lever 202 with respect to the adjuster should be such that the surface 226 of disc 206 engages surface 228 of housing 112 at approximately the same time during the power stroke of the brake cylinder that the brake shoes contact the truck wheels (assuming that all brake shoes are new and in place), which movement of parts in the meantime will have moved hub member 180 sufficiently against the action of spring 190 to free balls 184 from surface 186 (by disc 206 engaging hub end 229).

After the adjuster 10 has been applied in its operating position in the manner indicated, spring 118, which preferably is designed to provide a force on the order of 200 pounds, biases the seat 166 of housing 112 against the seat 164 of nut 88, which in turn biases the clutch surface 169 of the nut 88 against the clutch surface 171 of housing 80 and presses the adjusting nut against the coupling nut 86 to separate same from the stop clutch seat 110 of tubular member 80 against the biasing action of spring 160; it will be noted that in this condition the surface 169 of nut 88 engages the end surface 221 of nut 86 as at 222.

Inside the chamber 126 of the housing 106 of tubular member 80, spring 128, which preferably is designed to provide a force on the order of 250 pounds, biases the stop clutch seat 146 of seat structure 132 against the tubular member stop clutch seat 148, and spring element 154 biases holding nut 90 against the stop clutch seat 150 of seat structure 132. The coupling nut 86 is limited in its permissible movement by the presence of the disc member 138 which forms the spring seat for end 136 of spring 128, as well as spring element 160 and the presence of the adjusting nut 88 on the other side of nut 86. Spring element 160 should be designed to bias nut 86 against nut 88 so that they are frictionally coupled together at 222 unless physically separated. At the end 115 of housing 112 the spring 118 seats the spring seat 114 firmly against the end 115 of the housing 112, with the relation of parts being such that balls 184 ride on, but are not jammed into wedging relation between the conical surface 186 of the housing 112 and the external surface 219 of tubular member 80.

It will be noted that the combined strength of springs 118 and 128 resists adjustment of the coupling assembly 91, as spring 118 acts to resist movement of tubular member 80 relative to rod member 84 (to the right of FIG. 5) through the engagement of housing 112 with adjusting nut 86, and spring 128 acts to resist the same movement between the same parts by the engagement of spring 128 between its seat 138 and seat structure 132 which in turn engages holding nut 90.

When the brakes are initially set or applied by activating the brake cylinder 16 in the usual manner, the brake cylinder 16 through its piston 17 forces thrust rod 18 to the right of FIG. 1, causing the cylinder lever 20 to swing counterclockwise about the pivotal connection 24 between it and the center rod structure 12 and move connecting rod 12 to the left, as already described. This places the center rod structure 12 under tension and tends to draw the tubular member 80 to the right of FIGS. 2, 4 and 5 with respect to the rod member 84 as tension builds up in the rigging, thus effecting "draw up."

Meanwhile, the movement of the cylinder lever 20 causes a corresponding differential movement of the trigger lever 202, which actuates the trigger mechanism 200 to move the disc 206 toward housing 112. The shortened condition of the adjuster plus the presence of new brake shoes between the brake beams and the wheels will result in the disc 206 being well short of the end 115 of housing 112 when the brake shoes contact the wheels 57. As the brake cylinder goes through completion of its power stroke, the tension in the rigging tends to separate the end surface 171 of the tubular member housing 106 from the surface 169 of adjusting nut 188, which will result in the housing 112, its spring 118, and nuts 86, 88 and 90 rotating with respect to member 84 in a slack let out direction that continues until the surface 226 of trigger device disc member 206 engages end surface 228 of the housing 112, at which point the surface 169 of adjusting nut 88 will again engage the surface 171 of tubular member 80 to stop rotation of the nuts and housing 112. As the braking stroke is completed, tubular member 80 is moved to the right with respect to the coupling nut 86 to bring its seat 110 against the seat 108 of the coupling nut for transmission through the tubular member 80 and rod member 84 of the full braking force.

In this connection, there must be sufficient "play" between the balls 184 and housing 112 to permit the movement required between members 80 and 84 that will achieve separation of surfaces 169 and 171, so that the nuts and housing 112 can spin to provide slack let out (under the conditions indicated). When slack let out is complete, the pressure of disc 206 against housing surface 228 insures that for the final phases of the brake application (during which slack let out occurs) balls 184 are displaced to the left of surface 186 adequately to permit clutch surface 110 of member 80 to engage clutch surface 108 of coupling nut 86.

In the slack let out functioning of the adjuster, once the separation occurs between the surface 169 of the adjusting nut 88 and the end surface 171 of the tubular member 80, the coupling nut 86 rotates with the adjusting nut 88 due to the frictional engagement between the two at their point of contact at 222, and the resulting movement of the rod member 84 to the left of FIGS. 2, 4 and 5 relative to the tubular member 80 spins holding nut 90 in combination with seat structure 132, which is permitted by slippage between clutch surfaces 146 and 148 due to the drawing action that is applied to the holding nut 90.

On release, the parts of the adjuster return to the positions of FIG. 5, with the exception that the terminal end 110 of the rod member 84 will be disposed adjacent but within the entry 227 of tubular member bore 102 to define the position of maximum extension of adjuster 10. Thereafter, the normal operation of the adjuster will be as follows:

The usual operating or riding position of the adjuster parts will be substantially as indicated at FIGS. 4 and 5 with the exception that the amount that the rod member 84 is retracted into the tubular member 80 will depend upon the amount of wear that the brakes have been subjected to. Springs 118 and 128 together with ball type wedge lock 197 hold the coupling assembly 91 that acts between the two primary adjuster members 80 and 84 against displacement due to end of car impacts, vibration, and the like.

Insofar as slack take up is concerned, when the brakes are applied, the housing member 80, under the stresses building up in the rigging, tends to move to the right of FIGS. 2, 4 and 5, relative to rod member 80, under the operation of brake cylinder 16, which relative movement is opposed by springs 112 and 128 and wedge lock device 197, as aforedescribed. The differential motion of the trigger device 200 results in the trigger lever 202, through rod 208, sleeve 214 and weldment 205, moving disc member 206, at the same time, toward surface 228 of housing 112, with the relation of the parts being such that when the surface 226 of disc 206 engages the surface 228 of housing 112, the brake shoes are brought against the wheels 57 (and lock 197 has just previously been released by the action of disc 206 engaging the end 229 of hub 180).

As the full thrust of the brake applying forces are transmitted between the rod member 84 and the tubular member 80, trigger lever 202 continues to move disc 206, to the left of tubular member 80 as brake wear is occasioned with the result that the spring 118 is compressed and housing 112 moves to the left of these figures to urge the adjusting nut 88 to rotate in a slack take up direction (away from tubular member end surface 171) through spring element 170, with the compression of the spring element 170 involved resulting in sufficient separation of the stop clutch surfaces 166 and 164 so that the adjusting nut is freed to rotate as indicated. Coupling nut 86 in being biased against the nut 88 by spring element 160 rotates with the nut 88 until its surface 108 is engaged by stop clutch surface 110 of housing member 80, which positions the coupling nut 86 for transmission therethrough of the full braking forces, nut 88 continuing to rotate in a slack take up direction with respect to rod member 84 until the brake stroke is completed. As housing 112 is moved to the left of FIGS. 4 and 5, balls 184 remain spaced from surface 186 due to the engagement of disc 206 with hub end 229.

On release, the trigger device disc member 206 returns to the right of FIGS. 2, 4, and 5 under the action of the brake beams falling away from the wheels, and spring 118 returns stop clutch seat 166 of housing 112 against stop clutch seat 164 of adjusting nut 88 and applies a bias to the nut 88 to draw same together with rod member 84 to the right of FIG. 5 in a slack take up direction with respect to the tubular member 80 until the surface 169 of adjusting nut 88 engages end surface 171 of the tubular member. Under this relative movement of parts, coupling nut 86 is urged away from seat 110 against the bias of spring element 160 and spins in a slack take up direction relative to rod member 84 until it is engaged by the adjusting nut 88; holding nut 90 has its stop clutch surface 152 separated from stop clutch surface 150 of spring seat structure 132 to likewise rotate in a slack take up direction until the adjusting nut 88 is seated against the end surface 171 of the tubular member 80. Also, balls 184 of lock device 197 are returned to surface 186, but since housing 112 is returning to the right of FIG. 5 relative to tubular member 80, the lock 197 is ineffective to prevent the required return of the trigger mechanism to its initial or riding position.

Subsequent functioning of the brake operates in a similar manner to effect the desired take up in brake rigging slack that is necessary to maintain the desired brake cylinder stroke.

When brake shoes have been replaced, the first application of the brakes after replacement of the shoes effects the needed slack let out of the adjuster in the same manner as described in connection with the initial application of the adjuster to the rigging.

In addition to the advantages already described, this invention provides protection to the trigger lever in center rod applications when the car hand brake (not shown but ordinarily attached to the cylinder lever 20 at or adjacent connection 19) is set at a time when the brakes are already set, as is sometimes the practice where a train of cars is moved into a yard for separating purposes and after the engine leaves the train, the brakes are set under emergency air conditions. Under such conditions the brake cylinder thrust rod 18 may be pulled (by the hand brake acting to swing lever 20 to the right of FIG. 2) out or to the right another two inches over that normally experienced for the usual brake application; the remaining components of the rigging readily accommodate this movement except for the trigger lever which cannot shift at its end that cooperates with bracket 204, which results in the trigger lever being arced to the right of FIG. 2. Under such conditions, disc 206 of the trigger mechanism is pressed against housing 112, to release lock 197 and allowing spring 118 to yield under the pressure generated by such conditions, so that tubular member 80 and rod member 84 can be pulled to the right of FIGS. 2 and 5 (with nut 88 slipping at seats 164 and 166 to allow this relative movement), thus protecting the trigger lever against bending. Any change that is made in the adjuster length as a result of this action is automatically corrected on the next application of the brakes.

The ball bearing units 156, 162 and 172 may be of any suitable type that preferably includes race members 270 and 272 separated by ball members 274 operating in the usual raceway grooves 276. The units are only diagrammatically illustrated but it should be understood that they will ordinarily be of the type that includes a retaining means to equally space the bearing balls 274 about the bearing and a suitable seal arrangement to protect the balls.

MODIFIED FORMS OF THE INVENTION

Figures 6, 7:
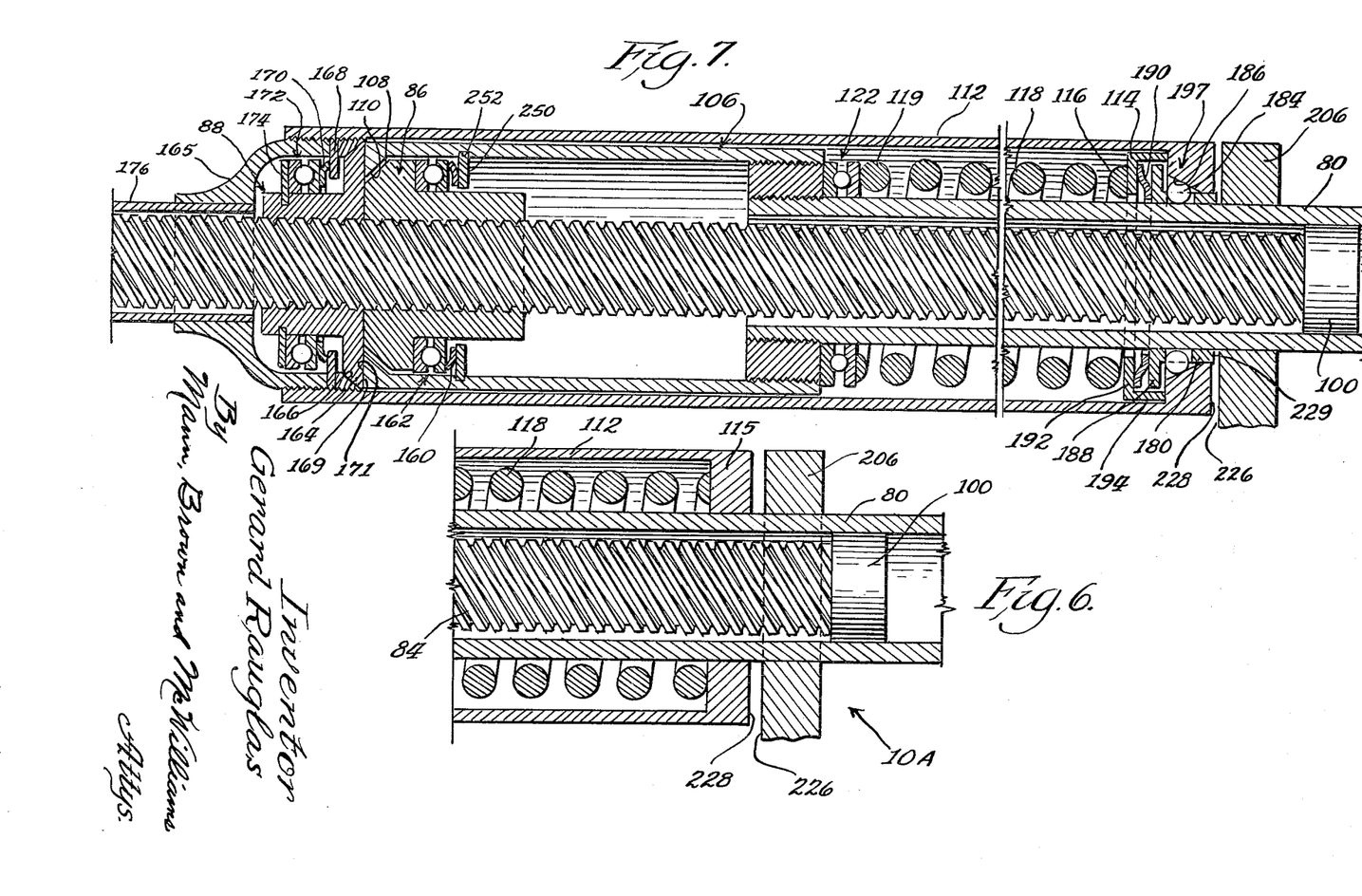
FIGS. 6 and 7 are views similar to that of FIG. 5 illustrating modified forms of the invention.

Lock 197 may be omitted to simplify the construction and still have an effective holding action on the coupling assembly 91. This simplified form 10A is shown in FIG. 6 wherein lock 197 as well as seat 114 are omitted and spring 118 bears directly against the end 115 of housing 112. Adjuster 10A operates in the same manner as adjuster 10 except that lock 197 and its functioning are not present.

I have also found that an effective holding action opposing undesired adjustment of the adjuster may be had by employing lock 197 in combination with spring 118, but omitting spring 128, holding nut 90 and the associated parts, as indicated in FIG. 7. In the embodiment 10B of FIG. 7, spring 160 is held in place by split annual disc 250 that is seated in recess 252 of housing 112, which thus performs the same function as spring seat 138, insofar as the coupling nut 90 is concerned. Adjuster 10B operates in the same manner as adjuster 10 except that lock 197 is relied on to completely take the place of spring 128 and its associated parts in maintaining the desired adjustment of the adjuster during riding conditions and draw up.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

I claim:

1. A brake adjuster adapted to form a part of railroad car brake rigging, said adjuster comprising:
 a pair of elongate members having portions thereof disposed in juxtaposed parallel relation,
 a housing received over said juxtaposed portions of said members,
 said portion of one of said elongate members being threaded and said portion of the other of said elongate members being tubular for receiving said portion of said one member,
 coupling nut means carried by said one member,
 said portion of said other member defining a chamber in which said coupling nut is disposed,
 said chamber including a clutch surface engageable with said coupling nut for transmitting braking forces through the adjuster tending to move said members in a let out directions,
 adjusting nut means carried by said one member,
 means for clutching said adjusting nut means between said housing and said other member against rotation with respect to said one member on movement of said housing toward said other member,
 said clutching means including a clutch seat carried by said housing and clutchably engageable with said adjusting nut means on movement of said housing toward said other member,
 means for moving said housing toward said one member in proportion to brake shoe wear on application of the brakes,
 means for releasably keying said housing to said adjusting nut means for movement therewith on actuation of said housing moving means whereby said adjusting nut means rotates in a slack take up direction with respect to said one member,
 resilient means acting on said housing for moving said members relative to each other in a slack take up direction in proportion to said brake shoe wear through said housing clutch seat acting on said adjusting nut means,
 holding nut means and releasable clutch seat means therefor disposed in said other member chamber,
 said holding nut means being carried by said one member,
 said resilient means comprising spring means acting between said housing and said other member for biasing said housing in the direction of said other member,
 and spring means received in said chamber and acting between said other member and said holding nut clutch seat means for holding said holding nut means against rotation with respect to said screw member in a slack let out direction,
 said clutch seat means including a clutch seat clutchably engageable with said other member under the action of the second mentioned spring means.

2. A two way automatic brake adjuster adapted to form a part of railroad car brake rigging, said adjuster comprising:
 a pair of elongate members having portions thereof disposed in juxtaposed parallel relation,
 one of said members comprising a screw member,
 said portion of said other member being tubular for receiving said portion of said screw member,
 a coupling nut threadedly carried by said screw member and mounted for movement longitudinally of the other of said members on relative movement movement between said members longitudinally thereof,
 said other member portion defining a chamber in which said coupling nut is disposed and a stop clutch seat positioned to engage said nut for transmitting braking forces through the adjuster on movement of said members relative to each other in a slack let out direction,
 an adjusting nut threadedly carried by said screw member,
 a housing member in circumambient relation about said nuts and the portions of said members adjacent same, and enclosing one end of said other member at said portion thereof,
 said adjusting nut being positioned adjacent said other member end exteriorly of said portion thereof, said housing member carrying a stop clutch seat engageable with said adjusting nut to preclude rotational movement of same on movement of said housing in the direction of said other member,
 said chamber seat being disposed at the end thereof adjacent said end of said other member,
 said housing seat being movable with said housing,
 said housing including means for releasably keying same to said adjusting nut for moving same therewith on movement of said housing longitudinally of said screw member and away from said other member,
 a holding nut carried by said screw member and positioned within said chamber of said other member adjacent the other end of said chamber,
 stop clutch seat means positioned in said chamber and engageable with said holding nut to preclude rotation of same,
 first resilient means interposed between said housing and said other member for biasing said members to move in a slack take up direction with respect to each other through said housing seat engaging said adjusting nut, second resilient means interposed between said other member and said stop clutch seat means of said chamber for biasing said stop clutch seat means into stop clutching engagement with said holding nut, said end of said other member being formed to define a stop clutch seat engaged by said adjusting nut under the action of said first resilient means on said members, and take up control means for effecting movement of said screw member relative to said other member in a slack take up direction under the action of said resilient means when said adjusting nut is separated from the last mentioned seat, said take up control means including actuator means movable with respect to said members during application of the brakes and including means for moving, during brake application said housing seat away from said adjusting nut seat against the biasing action of said first resilient means to advance said first adjusting nut along said screw, whereby on release of said brakes said first resilient means moves said members in a slack take up direction through said adjusting nut being clutched against rotation with respect to said screw member.

3. The brake adjuster set forth in claim 2 wherein:

said stop clutch seat means of said chamber includes a first stop clutch seat engageable with said holding nut and a second stop clutch seat engaging with said other member adjacent said other end of said chamber under the action of said second resilient means, and including resilient means interposed between said holding nut and said other end of said chamber for biasing said holding nut against said stop clutch means first seat, whereby when said screw member is moved relative to said other member in a slack take up direction, said holding nut in moving therewith disengages from said stop clutch seat means first seat to rotate relative to said screw member in a slack take up direction.

4. The brake adjuster set forth in claim 2 including a spring seat interposed between said second resilient means and said other member and being seated in said other member adjacent said coupling nut between same and said other end of said chamber, and resilient means interposed between said spring seat and said coupling nut to limit rotational movement of said coupling nut in the direction of said other member.

5. A brake adjuster adapted to form a part of railroad car brake rigging, said adjuster comprising:

a pair of elongate members having portions thereof disposed in juxtaposed parallel relation, a housing received over said juxtaposed portions of said members, said portion of one of said elongate members being threaded and said portion of the other of said elongate members being tubular for receiving said portion of said one member, coupling nut means carried by said one member, said portion of said other member defining a chamber in which said coupling nut is disposed, said chamber including a clutch surface engageable with said coupling nut for transmitting braking forces through the adjuster tending to move said members in a let out direction, adjusting nut means carried by said one member, means for clutching said adjusting nut means between said housing and said other member against rotation with respect to said one member on movement of said housing toward said other member, said clutching means including:

a clutch seat carried by said housing and clutchably engageable with said adjusting nut means on movement of said housing toward said other member, and a clutch seat formed on said portion of said other member against which said adjusting nut means is engageable, means for moving said housing toward said one member in proportion to brake shoe wear on application of the brakes, means for releasably keying said housing to said adjusting nut means for movement therewith on actuation of said housing moving means whereby said adjusting nut means rotates in a slack take up direction with respect to said one member, and resilient means acting on said housing for moving said members relative to each other in a slack take up direction in proportion to said brake shoe wear through said housing clutch seat acting on said adjusting nut means, said resilient means comprising spring means acting between said housing and said other member for biasing said housing in the direction of said other member and for biasing said housing clutch seat against said adjusting nut means to bias said adjusting nut means against said other member clutch seat of said clutching means.

6. The adjuster set forth in claim 5 including:

lock means interposed between said housing and said other member including means for releasably precluding movement of said other member outwardly of said housing under tension forces acting on said members, and means for releasing said lock means to accommodate said movement of said housing toward said one member.

7. The adjuster set forth in claim 5 including:

holding nut means and releasable clutch seat means therefor disposed in said other member chamber, said holding nut means being carried by said one member, and spring means received in said chamber and acting between said other member and said holding nut clutch seat means for holding said holding nut means against rotation with respect to said screw member in a slack out direction, said clutch seat means including a clutch seat clutchably engageable with said other member under the action of the second mentioned spring means, whereby said first and second mentioned spring means holds said nuts against adjustment during draw up and riding condition of the adjuster.

8. A brake adjuster adapted to form a part of railroad car brake rigging, said adjuster comprising:

a pair of elongate members having portions thereof disposed in juxtaposed parallel relation, a housing received over said juxtaposed portions of said members, said portion of one of said elongate members being threaded and said portion of the other of said elongate members being tubular for receiving said portion of said one member, coupling nut means carried by said one member, said portion of said other member defining a chamber in which said coupling nut is disposed, said chamber including a clutch surface engageable with said coupling nut for transmitting braking forces through the adjuster tending to move said members in a let out direction, adjusting nut means carried by said one member, means for clutching said adjusting nut means between said housing and said other member against rotation with respect to said one member on movement of said housing toward said other member, said clutching means including:
a clutch seat carried by said housing and clutchably engageable with said adjusting nut means on movement of said housing toward said other member,
and a clutch seat formed on said portion of said other member against which said adjusting nut means is engageable,
means for moving said housing toward said one member in proportion to break shoe wear on application of the brakes,
means for releasably keying said housing to said adjusting nut means for movement therewith on actuation of said housing moving means whereby said adjusting nut means rotates in a slack take up direction with respect to said one member,
resilient means acting on said housing for moving said members relative to each other in a slack take up direction in proportion to said brake shoe wear through said housing clutch seat acting on said adjusting nut means,
holding nut means and releasable clutch seat means therefor disposed in said other member chamber,
said holding nut means being carried by said one member,
said resilient means comprising spring means acting between said housing and said other member for biasing said housing in the direction of said other member and for biasing said housing clutch seat against said adjusting nut means to bias said adjusting nut means against said other member clutch seat of said clutching means,
said spring means received in said chamber and acting between said other member and said holding nut clutch seat means for holding said holding nut means against rotation with respect to said screw member in a slack let out direction,
said clutch seat means including a clutch seat clutchably engageable with said other member under the action of the second mentioned spring means,
lock means interposed between said housing and said other member including means for releasably precluding movement of said other member outwardly of said housing under tension forces acting on said members,
and means for releasing said lock means to accommodate said movement of said housing toward said one member.

References Cited

UNITED STATES PATENTS

| | | | |
|---|---|---|---|
| 2,837,179 | 6/1958 | Jeppsson | 188—196 |
| 3,285,375 | 11/1966 | Jeppsson et al. | 188—196 |
| 3,448,836 | 6/1969 | Rauglas | 188—202 |

DUANE A. REGER, Primary Examiner

U.S. Cl. X.R.

188—196

PO-1050
(5/69)

UNITED STATES PATENT OFFICE
CERTIFICATE OF CORRECTION

Patent No. 3,512,619     Dated May 19, 1970

Inventor(s) Gerard Rauglas

It is certified that error appears in the above-identified patent and that said Letters Patent are hereby corrected as shown below:

Column 5, line 32, for "tub" read -- hub --.
Column 9, line 65, for "directions" read -- direction --.
Column 10, line 39, delete "movement" (word repeated).
Column 12, line 46, after "slack" insert -- let --.

SIGNED AND
SEALED
OCT 20 1970

(SEAL)
Attest:

Edward M. Fletcher, Jr.
Attesting Officer

WILLIAM E. SCHUYLER, JR.
Commissioner of Patents